(12) United States Patent
Takahashi et al.

(10) Patent No.: US 11,976,206 B2
(45) Date of Patent: May 7, 2024

(54) INK SET FOR INKJET RECORDING AND IMAGE RECORDING METHOD

(71) Applicant: FUJIFILM CORPORATION, Tokyo (JP)

(72) Inventors: Koki Takahashi, Kanagawa (JP); Toshiyuki Makuta, Kanagawa (JP); Tomohiro Mizuno, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 309 days.

(21) Appl. No.: 17/472,732

(22) Filed: Sep. 13, 2021

(65) Prior Publication Data
US 2021/0403742 A1 Dec. 30, 2021

Related U.S. Application Data

(63) Continuation of application No. PCT/JP2019/042578, filed on Oct. 30, 2019.

(30) Foreign Application Priority Data

Mar. 28, 2019 (JP) ................................. 2019-064593

(51) Int. Cl.
C09D 11/54 (2014.01)
C09D 11/101 (2014.01)
C09D 11/107 (2014.01)

(52) U.S. Cl.
CPC ............ *C09D 11/54* (2013.01); *C09D 11/101* (2013.01); *C09D 11/107* (2013.01)

(58) Field of Classification Search
CPC ..... C09D 11/54; C09D 11/101; C09D 11/107; C09D 11/40; C09D 11/38
See application file for complete search history.

(56) References Cited

U.S. PATENT DOCUMENTS

| | | | |
|---|---|---|---|
| 2015/0174945 A1 | 6/2015 | Garnier et al. | |
| 2015/0180056 A1 | 6/2015 | Hood | |
| 2016/0245968 A1* | 8/2016 | Ichihara | G06V 30/1423 |
| 2017/0227693 A1 | 8/2017 | Ito et al. | |
| 2017/0269273 A1 | 9/2017 | Nagai et al. | |
| 2017/0343830 A1 | 11/2017 | Nagai et al. | |
| 2018/0107106 A1 | 4/2018 | Ichihara et al. | |
| 2019/0302603 A1 | 10/2019 | Yanai et al. | |
| 2021/0008916 A1 | 1/2021 | Makuta et al. | |

FOREIGN PATENT DOCUMENTS

| | | | | |
|---|---|---|---|---|
| CN | 105911626 A | 8/2016 | | |
| CN | 107003784 A | 8/2017 | | |
| CN | 107111030 A | 8/2017 | | |
| CN | 107250910 A | 10/2017 | | |
| EP | 3786239 A1 * | 3/2021 | ............ | B41M 3/006 |
| JP | 2008-100501 A | 5/2008 | | |
| JP | 2009-083272 A | 4/2009 | | |
| JP | 2010-143041 A | 7/2010 | | |
| JP | 2010-191146 A | 9/2010 | | |
| JP | 2011-099888 A | 5/2011 | | |
| JP | 2013-043894 A | 3/2013 | | |
| JP | 2015-516105 A | 6/2015 | | |
| JP | 2015-526311 A | 9/2015 | | |
| JP | 2016114661 A | 6/2016 | | |
| JP | 2016-153861 A | 8/2016 | | |
| WO | 2016/067984 A1 | 5/2016 | | |
| WO | 2016/133223 A1 | 8/2016 | | |
| WO | 2016/204067 A1 | 12/2016 | | |
| WO | 2018/116931 A1 | 6/2018 | | |
| WO | 2018/230553 A1 | 12/2018 | | |
| WO | 2019/188846 A1 | 10/2019 | | |

OTHER PUBLICATIONS

Allnex DPHA, [retrieved on Dec. 30, 2023, entire document (Year: 2023).*
Andre, R et al., Radiation Curable Composition Used as UV Curable Inkjet Ink for Making Plated Article Contains Monofunctional (meth)acrylate With Carboxylic Acid, Phosphoric Acid or Phosphonic Acid Groups, Acrylamide And Polyfunctional (meth)acrylate (EP 3 768 239 A), Mar. 3, 2021, entire document (Year: 2021).*
English language translation of the following: Office action dated Jul. 4, 2022 from the SIPO in a Chinese patent application No. 201980094284.6 corresponding to the instant patent application. This office action translation is submitted now in order to supplement the understanding of the cited references which are being disclosed in the instant Information Disclosure Statement.
English language translation of the following: Office action dated Jan. 19, 2023 from the SIPO in a Chinese patent application No. 201980094284.6 corresponding to the instant patent application.
Extended European Search Report dated Mar. 31, 2022, issued in corresponding EP Patent Application No. 19921902.3.
International Search Report issued in International Application No. PCT/JP2019/042578 dated Dec. 24, 2019.
Written Opinion of the ISA issued in International Application No. PCT/JP2019/042578 dated Dec. 24, 2019.
English language translation of the following: Office action dated Dec. 13, 2022 from the JPO in a Japanese patent application No. 2021-508710 corresponding to the instant patent application. This office action translation is submitted now in order to supplement the understanding of the cited references which are being disclosed in the instant Information Disclosure Statement.
English language translation of the following: Office action dated Jun. 14, 2022 from the JPO in a Japanese patent application No. 2021-508710 corresponding to the instant patent application.

(Continued)

*Primary Examiner* — Lisa Solomon
(74) *Attorney, Agent, or Firm* — SOLARIS Intellectual Property Group, PLLC

(57) ABSTRACT

An ink set for inkjet recording includes a base ink which contains at least one polymerizable compound selected from the group consisting of a monofunctional polymerizable compound and a difunctional polymerizable compound and an image recording ink which contains a polymerizable liquid crystal compound and a chiral compound. An image recording method uses the ink set.

9 Claims, No Drawings

(56) References Cited

OTHER PUBLICATIONS

English language translation of the following: Office action dated Jul. 14, 2023 from the SIPO in a Chinese patent application No. 201980094284.6 corresponding to the instant patent application.
English language translation of the following: Office action dated Nov. 17, 2023 from the SIPO in a Chinese patent application No. 201980094284.6 corresponding to the instant patent application.

* cited by examiner

INK SET FOR INKJET RECORDING AND IMAGE RECORDING METHOD

CROSS-REFERENCE TO RELATED APPLICATIONS

This application is a Continuation of International Application No. PCT/JP2019/042578, filed Oct. 30, 2019, which claims priority to Japanese Patent Application No. 2019-064593, filed Mar. 28, 2019. Each of the above applications is hereby expressly incorporated by reference, in its entirety, into the present application.

BACKGROUND OF THE INVENTION

1. Field of the Invention

The present disclosure relates to an ink set for inkjet recording and an image recording method.

2. Description of the Related Art

In recent years, an image recording method using an ink containing a liquid crystal compound has been proposed. Cholesteric liquid crystals prepared by adding a chiral agent to a liquid crystal compound have unique light reflectivity which enables the liquid crystals to change tone depending on the viewing angle. In a case where an ink containing a liquid crystal compound is used, it is possible to record a special image that is invisible in other image recording materials. Therefore, such an ink is expected to be applied to special decorations for articles such as packaging materials and security printing.

For example, WO2016/204067A discloses a cholesteric liquid crystal ink applied to a substrate. Furthermore, JP2015-516105A discloses an emulsion used for forming a cholesteric layer on a support. In addition, JP2011-099888A discloses an identification medium comprising a cholesteric liquid crystal layer.

SUMMARY OF THE INVENTION

However, depending on the type of substrate to which the ink is applied, sometimes the ink is absorbed into the substrate, and the tone unique to the cholesteric liquid crystals is not obtained. For example, in WO2016/204067A, although a base layer is formed on a substrate, because the substrate is fully coated with a solution for forming the base layer by using a bar coater, the texture of the substrate is not maintained. Furthermore, although JP2015-516105A describes that a support is treated by appropriate methods before coating or printing in some cases, those methods are all considered to treat the entire support, and the texture of the support is not maintained accordingly. In addition, although a cholesteric liquid crystal layer is formed on an adhesive layer in JP2011-099888A, this document does not specifically disclose the composition of materials constituting the adhesive layer and the method for forming the adhesive layer. That is, JP2011-099888A does not pay attention to the substrate provided with the cholesteric liquid crystal layer.

The present disclosure has been made in consideration of such circumstances. According to an embodiment of the present invention, there are provided an ink set for inkjet recording and an image recording method that can realize excellent color development without impairing the texture of a substrate regardless of the type of substrate.

Specific means for solving the above problems are as follows.

<1> An ink set for inkjet recording, comprising: a base ink comprising at least one polymerizable compound selected from the group consisting of a monofunctional polymerizable compound and a difunctional polymerizable compound; and an image recording ink comprising a polymerizable liquid crystal compound and a chiral compound.

<2> The ink set for inkjet recording described in <1>, wherein the base ink comprises at least two polymerizable compounds including the at least one polymerizable compound.

<3> The ink set for inkjet recording described in <2>, wherein the at least two polymerizable compounds include the at least one polymerizable compound and at least one polymerizable compound having three or more functional groups.

<4> The ink set for inkjet recording described in any one of <1> to <3>, wherein the base ink is an active energy ray-curable ink.

<5> The ink set for inkjet recording described in any one of <1> to <4>, wherein the base ink and the image recording ink each have a viscosity of 30 mPa·s or less.

<6> The ink set for inkjet recording described in any one of <1> to <5>, wherein: the image recording ink includes at least two image recording inks respectively having different reflection wavelengths, and the at least two image recording inks differ from each other in terms of a content of the chiral compound.

<7> The ink set for inkjet recording described in any one of <1> to <6>, wherein: the image recording ink includes at least two image recording inks respectively having different reflection wavelengths, and the at least two image recording inks differ from each other in terms of at least one of a type of the polymerizable liquid crystal compound or a content of the polymerizable liquid crystal compound.

<8> An image recording method using the ink set for inkjet recording described in any one of <1> to <7>, the method comprising: forming a base layer by applying the base ink to a substrate by inkjet recording method; and recording an ink image by applying the image recording ink to the base layer by inkjet recording method.

<9> The image recording method described in <8>, wherein forming the base layer includes irradiating the base ink applied to the substrate with an active energy ray.

According to an embodiment of the present disclosure, it is possible to provide an ink set for inkjet recording and an image recording method that can realize excellent color development without impairing the texture of a substrate regardless of the type of substrate.

DESCRIPTION OF THE PREFERRED EMBODIMENTS

Hereinafter, the ink set for inkjet recording and the image recording method of the present disclosure will be specifically described.

In the present specification, a range of numerical values described using "to" means a range including numerical values described before and after "to" as a minimum value and a maximum value, respectively.

Regarding the ranges of numerical values described stepwise in the present specification, the upper limit or the lower limit described in a certain range of numerical values may be replaced with the upper limit or the lower limit of another range of numerical values described stepwise. In addition, in the ranges of numerical values described in the present specification, the upper limit or the lower limit described in a certain numerical range may be replaced with the value shown in Examples.

In the present specification, in a case where there is a plurality of substances in a composition that corresponds to each component of the composition, unless otherwise specified, the amount of each component of the composition means the total amount of the plurality of substances present in the composition.

Furthermore, in the present specification, a combination of two or more preferred embodiments is a more preferred embodiment.

In addition, in the present specification, the term "step" includes not only an independent step but also a step which is not clearly distinguished from another step as long as the intended purpose of the step is achieved.

In the present specification, "(meth)acrylate" means acrylate or methacrylate.

Furthermore, in the present specification, the description of "texture of a substrate is not impaired" means that there is only a small difference in at least appearance or tactile properties between a substrate and the same substrate on which a base layer is formed. For example, the description means that breakage or the like hardly occurs in a case where a bending stress or the like is applied to the substrate.

According to the present disclosure, by forming a base layer on a substrate by using a base ink and then applying an image recording ink to the base layer, it is possible to record an ink image. The ink image is a cured product of the image recording ink. In the present disclosure, the image recording ink contains a polymerizable liquid crystal compound and a chiral compound. In a case where the image recording ink is cured, the polymerizable liquid crystal compounds form a helical structure by the chiral compounds, and turn into cholesteric liquid crystals. The cholesteric liquid crystals selectively reflect light having a wavelength corresponding to the pitch of the helical structure and exhibit the structural color. As a result, the ink image in the present disclosure expresses the structural color. In the related art, in a case where an ink containing a composition that can turn into cholesteric liquid crystals is directly applied to an ink-absorbing substrate, sometimes the ink permeates into the substrate, and excellent color development is not be obtained. It is considered that this is because the directions of helical axes of the cholesteric liquid crystals contained in the ink cured on the substrate are not uniform. In a case where the direction of helical axes of the cholesteric liquid crystals is perpendicular to the substrate, the liquid crystals reflect incidence rays perpendicular to the substrate. In contrast, in a case where the direction of helical axes of the cholesteric liquid crystals is parallel to the substrate, the liquid crystals transmit incidence rays perpendicular to the substrate. That is, it is considered that the greater the variation in the directions of helical axes of the cholesteric liquid crystals, the lower the intensity of reflected light, and excellent color development cannot be obtained. Therefore, in the related art, a non-ink-absorbing substrate is used as a substrate, or in a case where an ink-absorbing substrate is used, a method is adopted in which a base layer is provided in advance on the ink-absorbing substrate and then an ink is applied thereto. However, in the method of the related art, because the base layer is provided on the entire surface of the substrate, the texture of the substrate is not maintained.

Furthermore, even though a non-ink-absorbing substrate is used, sometimes excellent color development is not obtained depending on the surface condition of the substrate. In the present disclosure, because the base ink is applied to the substrate by an inkjet recording method, a flexible base layer can be formed at a desired site on the substrate. Furthermore, in the present disclosure, because the image recording ink is applied by an inkjet recording method, an ink image can be recorded at a desired site. "Desired site" means the entire surface of the substrate or a part of the substrate that is appropriately selected. Therefore, excellent color development can be realized without impairing the texture of the substrate. Furthermore, because the base layer is formed on the substrate by using the base ink, the uniformity of the helical axis directions of the cholesteric liquid crystals is further improved, and excellent color development can be realized regardless of the type of substrate.

Ink Set for Inkjet Recording

The Ink set for inkjet recording of the present disclosure includes a base ink and an image recording ink. The base ink contains at least one polymerizable compound selected from the group consisting of a monofunctional polymerizable compound and a difunctional polymerizable compound. The image recording ink contains a polymerizable liquid crystal compound and a chiral compound.

Base Ink

In the present disclosure, the base ink contains at least one polymerizable compound selected from the group consisting of a monofunctional polymerizable compound and a difunctional polymerizable compound. The base ink is an ink for inkjet recording.

<Polymerizable Compound>

The monofunctional polymerizable compound is not particularly limited as long as it has one functional group and can be polymerized with other compounds. The monofunctional polymerizable compound may be any of a monomer, an oligomer, and a polymer. Examples of the monofunctional polymerizable compound include monofunctional (meth)acrylate, monofunctional (meth)acrylamide, a monofunctional aromatic vinyl monomer, monofunctional vinyl ether, and a monofunctional N-vinyl compound. In the present disclosure, an oligomer means a compound having a weight-average molecular weight (Mw) of 3,000 or less, and a polymer means a compound having a weight-average molecular weight (Mw) more than 3,000.

Examples of the monofunctional (meth)acrylate include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxy ethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth) acrylate, 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth) acrylate, diethylaminopropyl (meth)acrylate, trimethoxysilylpropyl (meth)acrylate, trimethylsilylpropyl (meth) acrylate, polyethylene oxide monomethyl ether (meth) acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxy ethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth) acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, and N-t-butyl (meth)acrylamide, N-butoxymethyl (meth)acrylamide, N-isopropyl (meth) acrylamide, N-methylol (meth)acrylamide, N,N-dimethyl (meth)acrylamide, N,N-diethyl (meth)acrylamide, and (meth)acryloylmorpholine.

Examples of the monofunctional aromatic vinyl monomer include styrene, dimethyl styrene, trimethyl styrene, isopropyl styrene, chloromethylstyrene, methoxy styrene, acetoxystyrene, chlorostyrene, dichlorostyrene, bromostyrene, vinyl benzoic acid methyl ester, 3-methyl styrene, 4-methyl styrene, 3-ethyl styrene, 4-ethyl styrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, and 4-t-butoxystyrene.

Examples of the monofunctional vinyl ether include methyl vinyl ether, butyl vinyl ether, hexyl vinyl ether, methoxyvinyl ether, 2-ethylhexyl vinyl ether, methoxyethyl vinyl ether, cyclohexyl vinyl ether, chloroethyl vinyl ether, and triethylene glycol divinyl ether.

Examples of the monofunctional N-vinyl compound include N-vinylcaprolactam.

From the viewpoint of crosslinking properties, the monofunctional polymerizable compound is preferably a monofunctional (meth)acrylate. Furthermore, from the viewpoint of adhesiveness with the substrate and viscosity, among the monofunctional (meth)acrylates, isobornyl (meth)acrylate, phenoxyethyl (meth)acrylate, or tetrahydrofurfuryl (meth) acrylate is preferable.

The difunctional polymerizable compound is not particularly limited as long as it has two functional groups and can be polymerized with other compounds. The difunctional polymerizable compound may be any of a monomer, an oligomer, and a polymer. Examples of the difunctional polymerizable compound include a difunctional (meth)acrylate.

Examples of the difunctional (meth)acrylate include ethylene glycol di(meth)acrylate, diethylene glycol di(meth) acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, ethylene oxide (EO)-modified neopentyl glycol di(meth)acrylate, propylene oxide (PO)-modified neopentyl glycol di(meth) acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, and tricyclodecanedimethanol di(meth) acrylate. Examples of the difunctional (meth)acrylate include oligomers such as a urethane (meth)acrylate oligomer, an epoxy (meth)acrylate oligomer, and a polyester (meth)acrylate oligomer having two acryloyl groups or methacryloyl groups.

From the viewpoint of viscosity and flexibility after crosslinking, among the above difunctional (meth)acrylates, hexanediol di(meth)acrylate, dipropylene glycol di(meth) acrylate, neopentyl glycol di(meth)acrylate, polyethylene glycol (400) di(meth)acrylate, or 3-methyl-1,5-pentanediol di(meth)acrylate is preferable.

In the present disclosure, the base ink contains at least one polymerizable compound selected from the group consisting of a monofunctional polymerizable compound and a difunctional polymerizable compound. Therefore, the base layer formed of the base ink has flexibility. Having flexibility, the base layer can conform to the surface shape of the substrate, and there is only a small difference in at least appearance or tactile properties between the substrate and the same substrate on which the base layer is formed. For example, in a case where the substrate on which the base layer is formed is bent, the base layer can flexibly respond to the bending stress and is hardly broken accordingly. That is, even though the base ink is applied, the texture of the substrate is not impaired. In addition, in a case where the base ink contains at least one polymerizable compound selected from the group of a monofunctional polymerizable compound and a difunctional polymerizable compound, the base ink has optimal viscosity as an inkjet ink and has excellent jettability.

The content of at least one polymerizable compound selected from the group consisting of a monofunctional polymerizable compound and a difunctional polymerizable compound is preferably 50% by mass or more with respect to the total amount of polymerizable compounds in the base ink. In a case where the content of the at least one polymerizable compound is 50% by mass or more, the base layer has excellent flexibility. In addition, the base ink has an optimal viscosity as an inkjet ink and has excellent jettability. The upper limit of the content is not particularly limited, and is, for example, 100% by mass.

Furthermore, the base ink preferably contains at least two polymerizable compounds. At least one of the at least two polymerizable compounds is a polymerizable compound selected from the group consisting of a monofunctional polymerizable compound and a difunctional polymerizable compound, and the other is not particularly limited. From the viewpoint of suppressing elution of unreacted polymerizable compounds, the base ink preferably contains at least two polymerizable compounds, at least one of the at least two polymerizable compounds is preferably a polymerizable compound selected from the group consisting of a monofunctional polymerizable compound and a difunctional polymerizable compound, and the other is preferably a polymerizable compound having three or more functional groups. The polymerizable compound having three or more functional groups is not particularly limited as long as it has three or more functional groups and can be polymerized with other compounds, and may be any of a monomer, an oligomer, and a polymer.

Examples of the polymerizable compound having three or more functional groups include a (meth)acrylate having three or more functional groups.

Examples of the (meth)acrylate having three or more functional groups include trimethylolethane tri(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, and tris(2-acryloyloxyethyl) isocyanurate. Examples of the (meth)acrylate having three or more functional groups include oligomers such as a urethane (meth)acrylate oligomer, an epoxy (meth)acrylate oligomer, and a polyester (meth)acrylate oligomer having three or more acryloyl or methacryloyl groups.

In a case where the base ink contains the polymerizable compound having three or more functional groups, the amount of unreacted polymerizable compounds after polymerization is reduced, and the elution of unreacted polymerizable compounds is suppressed. Meanwhile, in a case where the base ink contains the polymerizable compound having three or more functional groups, the crosslink density tends to increase, and the viscosity of the base ink tends to increase. Therefore, in a case where the base ink contains the polymerizable compound having three or more functional groups, in order to maintain the viscosity of the base ink at an appropriate level, to ensure jetting stability for a long period of time, to maintain flexibility of the base layer, and to maintain the texture of the substrate, the content of at least one polymerizable compound selected from the group consisting of a monofunctional polymerizable compound and a difunctional polymerizable compound with respect to the total amount of polymerizable compounds in the base ink is preferably 50% by mass or more, and more preferably 60% by mass or more.

In the present disclosure, the base ink is preferably an active energy ray-curable ink. The polymerizable compounds contained in the base ink are preferably polymerized and cured by irradiation with active energy rays. Examples of the active energy rays include ultraviolet rays, visible rays, and electron beams. Among these, actinic rays such as ultraviolet rays and visible rays are preferable, and ultraviolet rays are more preferable. That is, the base ink is more preferably a photocurable ink, and even more preferably an ultraviolet-curable ink. In a case where the base ink is an active energy ray-curable ink, the base ink is cured at a high speed. Therefore, the subsequent image recording using an image recording ink can be smoothly performed.

Polymerization Initiator

The base ink preferably further contains a polymerization initiator. As the polymerization initiator, a photopolymerization initiator is preferable. The photopolymerization initiator is a compound having a function of generating radicals, which are active species of polymerization, by irradiation with active energy rays. In the present disclosure, the photopolymerization initiator more preferably has a function of generating radicals by irradiation with ultraviolet rays.

Examples of the photopolymerization initiator include an alkylphenone-based photopolymerization initiator, an acylphosphine oxide-based photopolymerization initiator, an intramolecular hydrogen abstraction-type photopolymerization initiator, an oxime ester-based photopolymerization initiator, and a cationic photopolymerization initiator. Among these, an acylphosphine oxide-based photopolymerization initiator is preferable. Specifically, (2,4,6-trimethylbenzoyl)diphenylphosphine oxide or bis(2,4,6-trimethylbenzoyl)phenylphosphine oxide is preferable.

The content of the polymerization initiator with respect to the total amount of the base ink is preferably 1% by mass to 30% by mass, and more preferably 2% by mass to 20% by mass.

As long as the effects of the present disclosure are not impaired, if necessary, the base ink can contain additives that are usually contained in an inkjet ink.

Examples of the additives include a surfactant, a solvent, and a crosslinking agent for improving jettability of the ink.

In the present disclosure, from the viewpoint of jetting stability, the viscosity of the base ink is preferably 30 mPa·s or less, more preferably 0.5 mPa·s to 20 mPa·s, and even more preferably 1 mPa·s to 15 mPa·s.

The viscosity of the base ink is a value measured using a viscometer (VISCOMETER RE-85L, manufactured by TOKI SANGYO CO., LTD.) at a liquid temperature kept at 25° C.

In the present disclosure, the surface tension of the base ink is preferably 20 mN/m to 40 mN/m, and more preferably 23 mN/m to 35 mN/m. The surface tension of the base ink is preferably 30 mN/m or less in terms of wettability and 20 mN/m or more in terms of permeability and suppression of image bleeding.

The surface tension is a value measured using a tensiometer (DY-700, manufactured by Kyowa Interface Science Co., Ltd.) at a liquid temperature kept at 30° C.

Image Recording Ink

In the present disclosure, the image recording ink contains a polymerizable liquid crystal compound and a chiral compound. The image recording ink is an ink for inkjet recording.

Polymerizable Liquid Crystal Compound

In the present disclosure, the polymerizable liquid crystal compound is a liquid crystal compound having a polymerizable group.

The liquid crystal compound may be a rod-like liquid crystal compound or a disk-like liquid crystal compound, but is preferably a rod-like liquid crystal compound.

Examples of the rod-like liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, or alkenylcyclohexylbenzonitriles are preferably used. As the rod-like liquid crystal compound, not only low-molecular-weight liquid crystal compounds but also high-molecular-weight liquid crystal compounds can be used.

The polymerizable liquid crystal compound can be obtained by introducing a polymerizable group into a liquid crystal compound. Examples of the polymerizable group include a polymerizable unsaturated group, an epoxy group, and an aziridinyl group. Among these, a polymerizable unsaturated group is preferable, and an ethylenically unsaturated group is particularly preferable. The number of polymerizable groups contained in the polymerizable liquid crystal compound is preferably 1 to 6, and more preferably 1 to 3. From the viewpoint of the durability of the image to be obtained, the polymerizable liquid crystal compound more preferably has two polymerizable groups in a molecule.

Examples of the polymerizable liquid crystal compound include the compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A.

Specific examples of the polymerizable liquid crystal compound include the following compounds (1) to (17). The polymerizable liquid crystal compound that can be used in each image recording ink is not limited to the following examples.

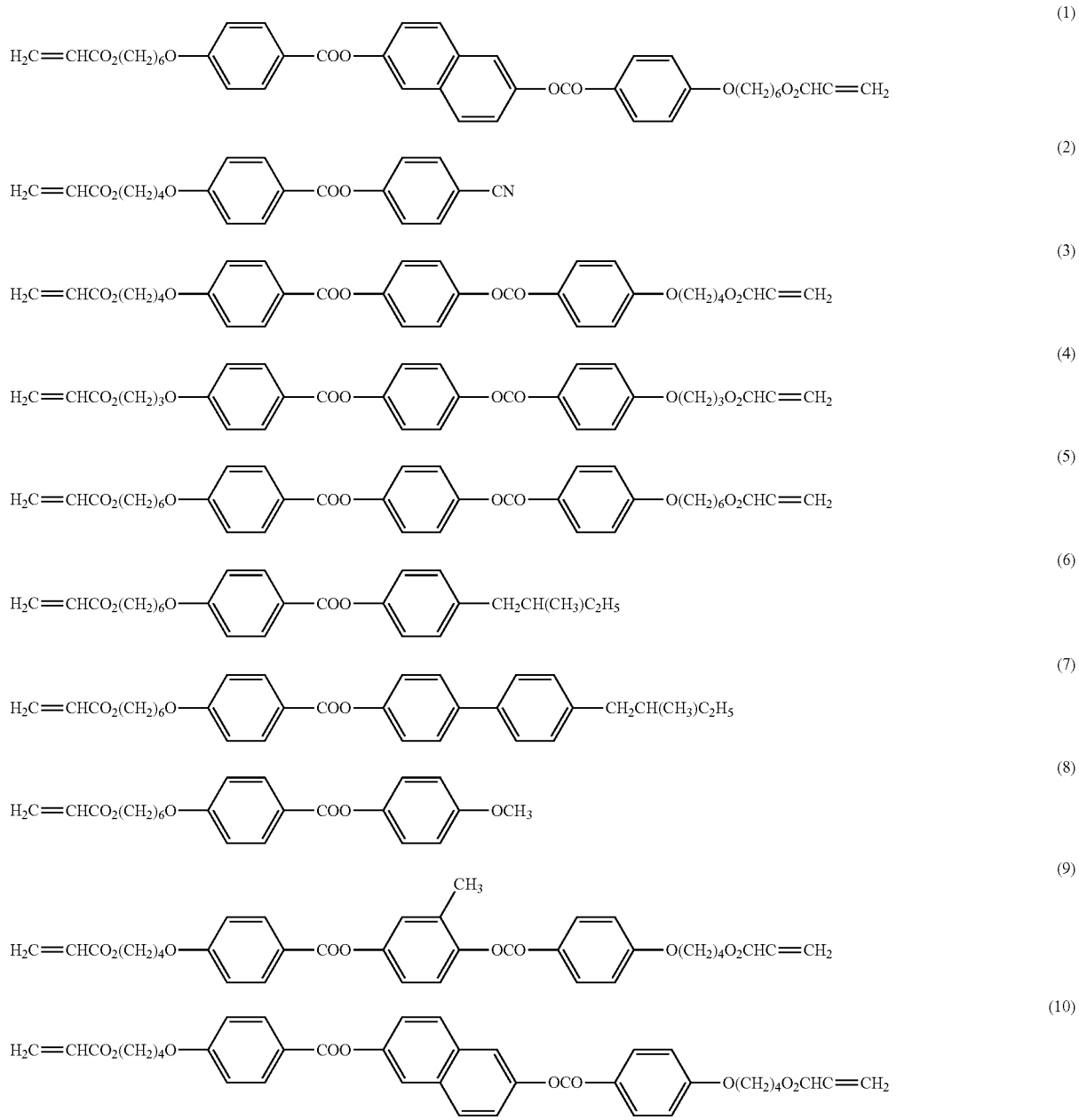

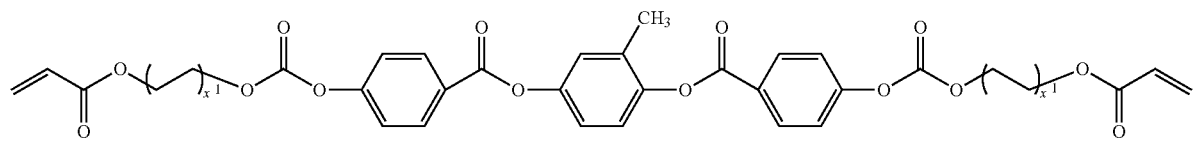
In the compound (11), $X^1$ each independently represents an integer of 2 to 5.
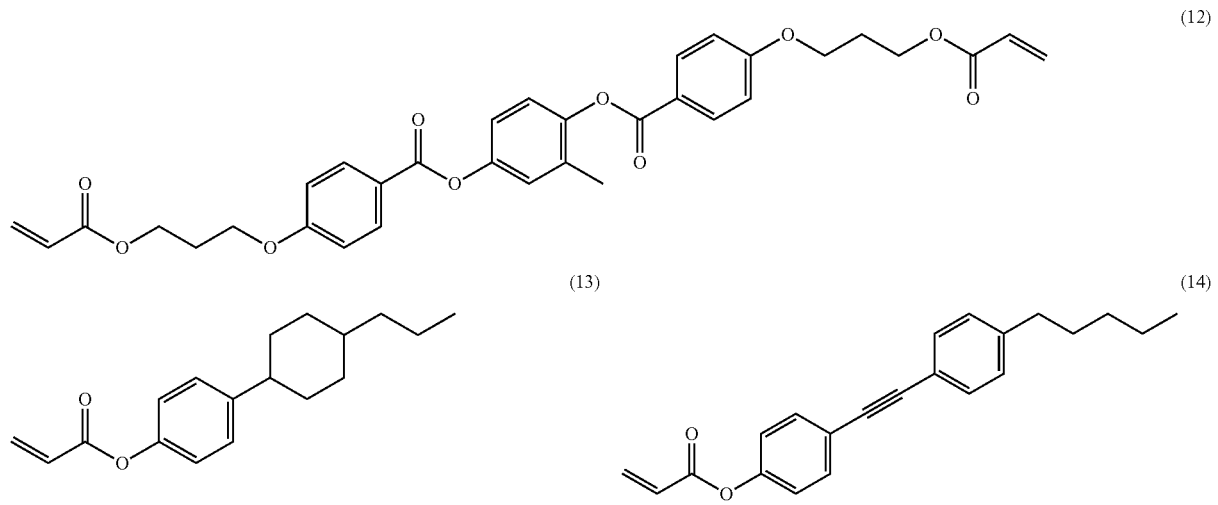
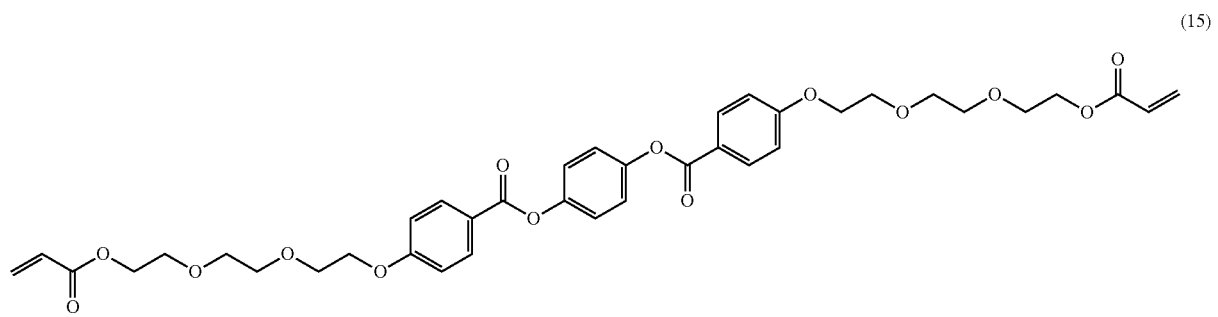
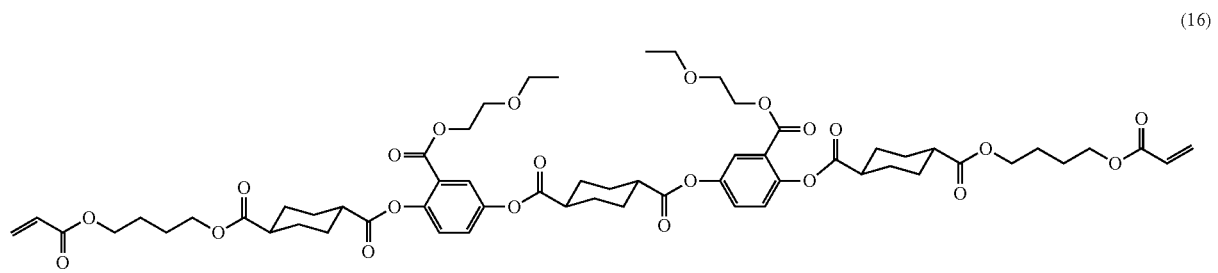

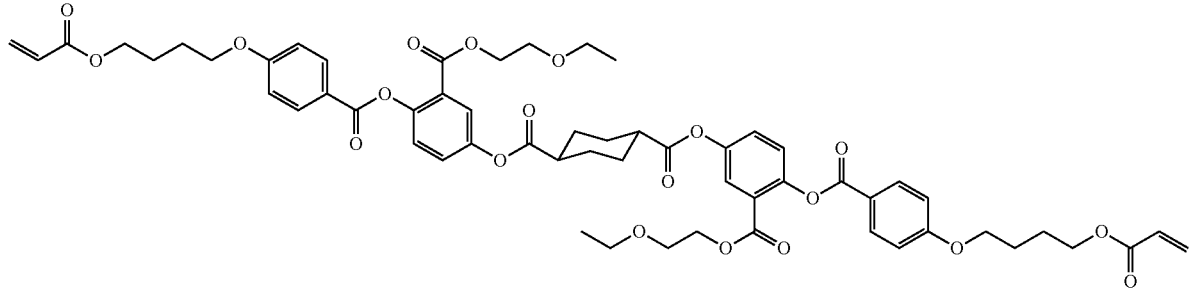

Examples of the polymerizable liquid crystal compound other than those exemplified above include the cyclic organopolysiloxane compounds disclosed JP1982-165480A (JP-S57-165480A).

Each image recording ink may contain one polymerizable liquid crystal compound or two or more polymerizable liquid crystal compounds.

The content of the polymerizable liquid crystal compound with respect to the total amount of the image recording ink is preferably 1% by mass to 70% by mass, more preferably 5% by mass to 50% by mass, and particularly preferably 10% by mass to 40% by mass.

The ink set for inkjet recording of the present disclosure preferably contains at least two image recording inks having different reflection wavelengths, and at least one of the type of the polymerizable liquid crystal compound or the content of the polymerizable liquid crystal compound preferably varies between the two image recording inks. The pitch of the helical structure of the cholesteric liquid crystals derived from the polymerizable liquid crystal compound and the wavelength of light to be selectively reflected vary with the type of the polymerizable liquid crystal compound. By varying the type of the polymerizable liquid crystal compounds, it is possible to obtain image recording inks of different tones. Furthermore, by varying the content of the polymerizable liquid crystal compounds, it is possible to vary the mixing ratio of the polymerizable liquid crystal compounds to the chiral compound and to obtain image recording inks of different tones.

Chiral Compound

The chiral compound is also called an optically active compound. The chiral compound has a function of inducing the helical structure of the polymerizable liquid crystal compound. The twist direction or pitch of the induced helical structure varies with the type of the chiral compound.

As the chiral compound, known compounds can be used without particular limitations (for example, see Liquid Crystal Device Handbook, Chapter 3, Section 4-3, Chiral Agent for TN and STN, p. 199, edited by the 142nd Committee of Japan Society for the Promotion of Science, 1989). Examples of the chiral compound include isosorbide derivatives and isomannide derivatives.

The chiral compound generally contains an asymmetric carbon atom. However, the chiral compound may not contain an asymmetric carbon atom as long as the compound has chirality. Examples of the chiral compound include an axially chiral compound having a binaphthyl structure, a helically chiral compound having a helicene structure, and a planarly chiral compound having a cyclophane structure.

The chiral compound may have a polymerizable group. In a case where the chiral compound has a polymerizable group, by a polymerization reaction between the chiral compound and the polymerizable liquid crystal compound, it is possible to form a polymer having a structural unit derived from the polymerizable liquid crystal compound and a structural unit derived from the chiral compound. In a case where the chiral compound has a polymerizable group, the polymerizable group is preferably the same type of group as the polymerizable group contained in the polymerizable liquid crystal compound. Therefore, the polymerizable group in the chiral compound is preferably a polymerizable unsaturated group, an epoxy group, or an aziridinyl group, more preferably a polymerizable unsaturated group, and particularly preferably an ethylenically unsaturated group. Furthermore, the chiral compound itself may be a liquid crystal compound.

Specific examples of the chiral compound include the following compounds, but the chiral compound that can be used in each image recording ink is not limited to the following examples. "Me" in each compound means a methyl group.

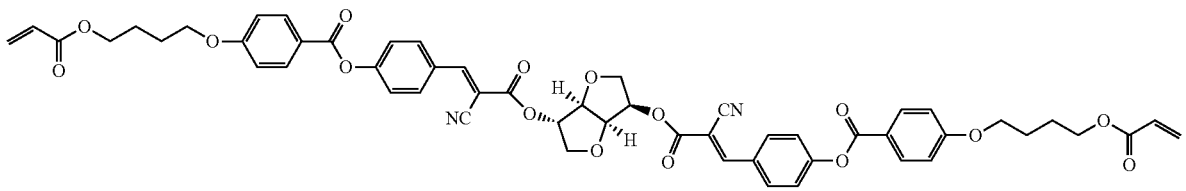

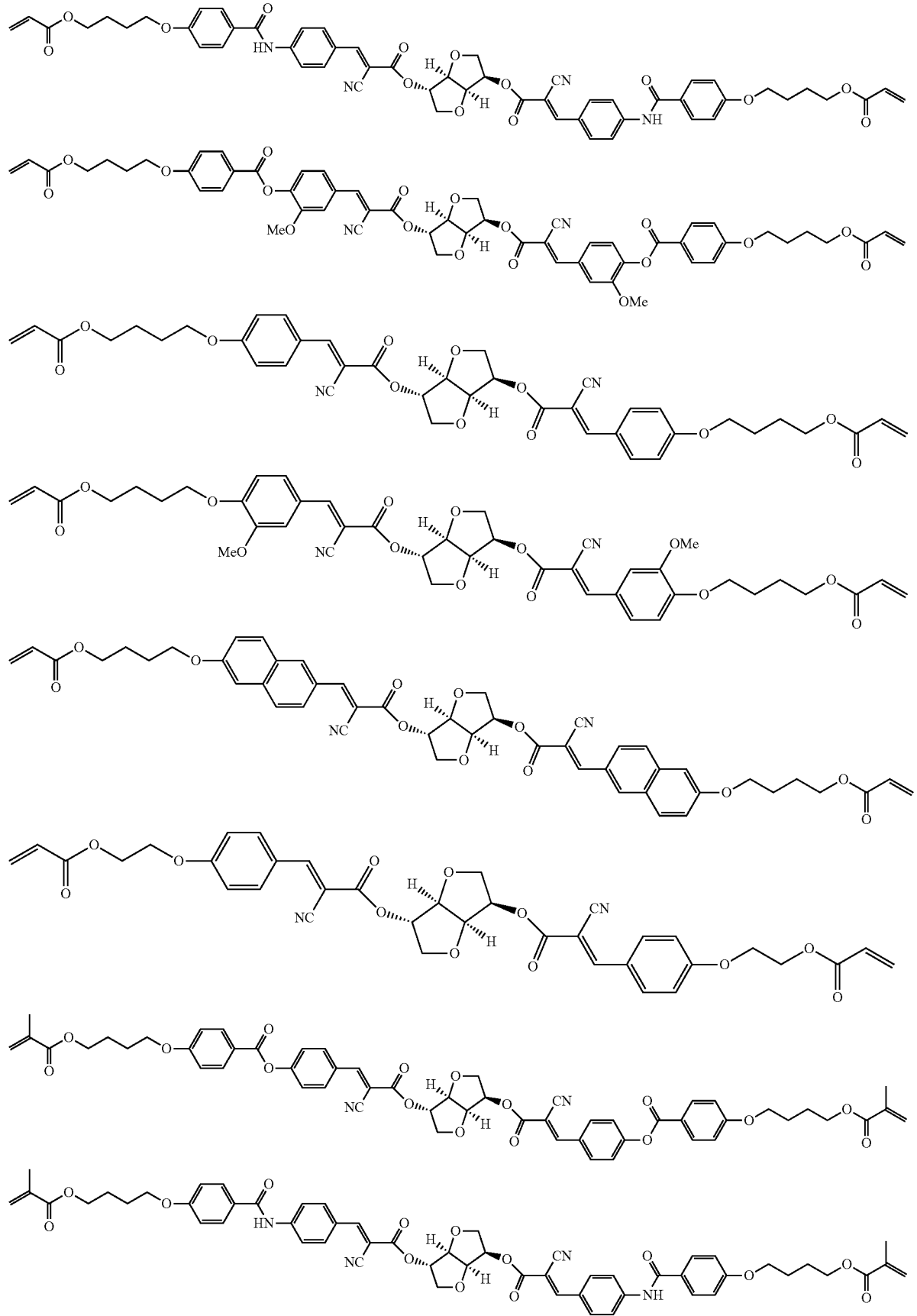

-continued
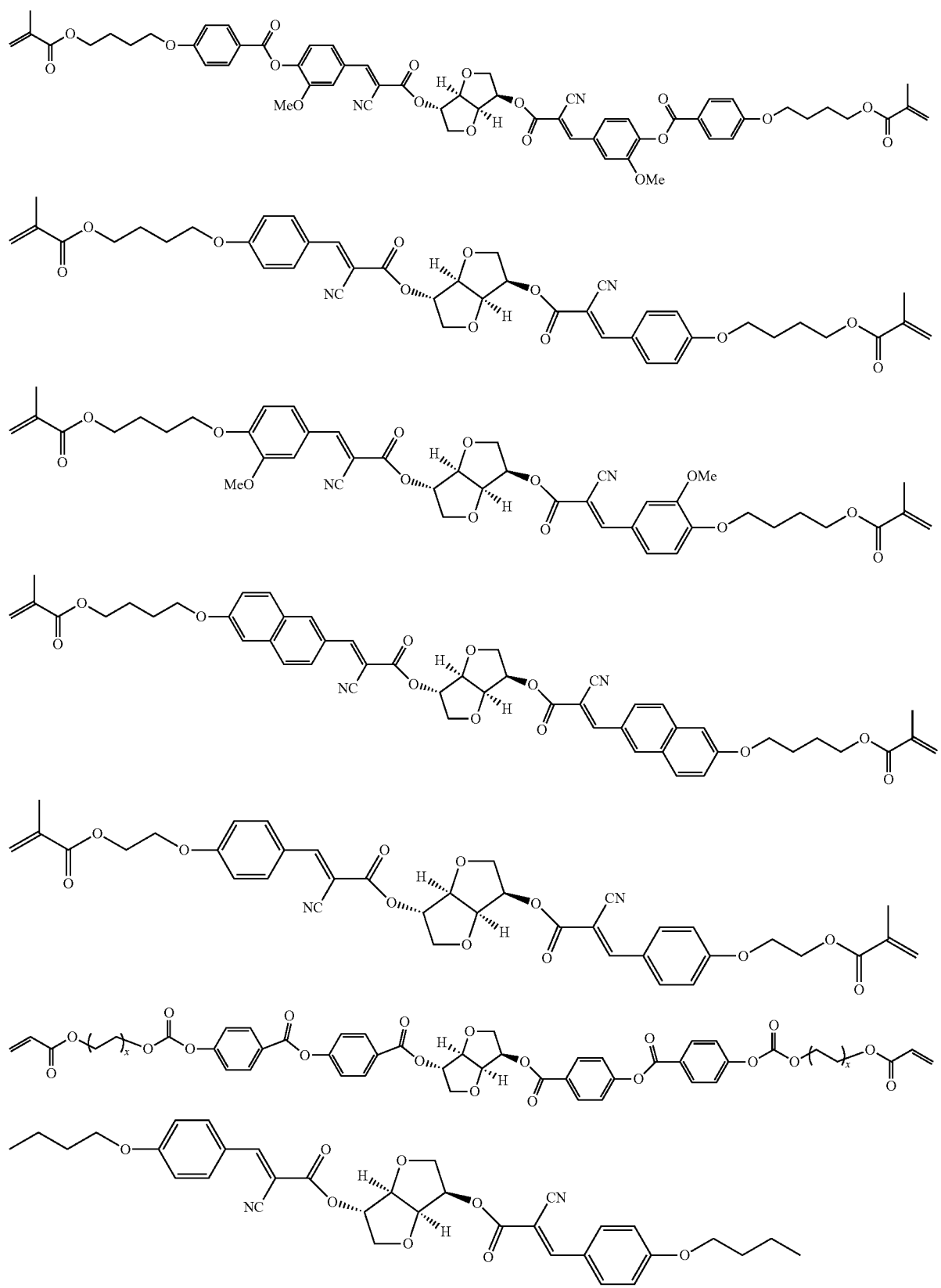

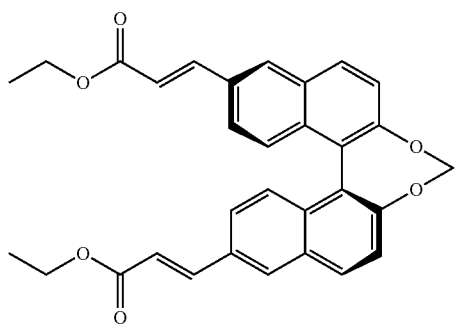

In the above compounds, X each independently represents an integer of 2 to 5.

In each image recording ink, the content of the chiral compound with respect to the content of polymerizable liquid crystal compounds is preferably 1% by mass to 15% by mass, and more preferably 3% by mass to 10% by mass.

The ink set for inkjet recording of the present disclosure preferably includes at least two image recording inks having different reflection wavelengths, and the content of the chiral compound preferably varies between the at least two image recording inks. The pitch of the helical structure of the cholesteric liquid crystals derived from the polymerizable liquid crystal compound and the wavelength of light to be selectively reflected vary with the content of the chiral compound. By varying the content of the chiral compounds, it is possible to obtain image recording inks of different tones. The larger the content of the chiral compound is, the shorter the reflection wavelength tends to be. The smaller the content of the chiral compound is, the longer the reflection wavelength tends to be.

Polymerization Initiator

Each of the image recording inks preferably further contains a polymerization initiator. The polymerization initiator is preferably a photopolymerization initiator, and more preferably a polymerization initiator having a function of generating radicals by irradiation with ultraviolet rays. Examples of the polymerization initiator include those exemplified above as the polymerization initiator contained in the base ink.

The content of the polymerization initiator with respect to the content of polymerizable liquid crystal compound contained in the image recording ink is preferably 0.1% by mass to 20% by mass, and more preferably 0.5% by mass to 12% by mass.

Additive

As long as the effects of the present disclosure are not impaired, if necessary, the image recording ink can contain additives that are usually contained in an inkjet ink.

Examples of the additives include a surfactant, a solvent, a crosslinking agent, and a non-polymerizable polymer for improving jettability of the ink.

In a case where the image recording ink contains a surfactant, the polymerizable liquid crystal compound molecules are horizontally aligned on the air interface side in the cured image recording ink, and the directions of the helical axes are more uniformly controlled. As the surfactant, a compound is preferable which can function as an alignment control agent stably and rapidly establishing a cholesteric structure with planar alignment. Examples of the surfactant include a silicone-based surfactant and a fluorine-based surfactant. Among these, a fluorine-based surfactant is preferable.

Specifically, examples of the surfactant include the compounds described in "0082" to "0090" of JP2014-119605A, the compounds described in "0031" to "0034" of JP2012-203237A, the compounds exemplified in "0092" and "0093" of JP2005-99248A, the compound exemplified in "0076" to "0078" and "0082" to "0085" of JP2002-129162A, and the fluorine (meth)acrylate-based polymers described in "0018" to "0043" of JP2007-272185A. One surfactant may be used alone, or two or more surfactants may be used in combination. As the fluorine-based surfactant, the compound represented by General Formula (I) described in "0082" to "0090" of JP2014-119605A is particularly preferable.

In a case where the image recording ink contains a surfactant, the content of the surfactant with respect to the content of the polymerizable liquid crystal compound is preferably 0.01% by mass to 10% by mass, more preferably 0.01% by mass to 5% by mass, and even more preferably 0.02% by mass to 1% by mass.

Each of the image recording ink may contain a solvent. The solvent is not particularly limited and can be appropriately selected depending on the purpose. As the solvent, an organic solvent is preferably used.

Examples of the organic solvent include a ketone-based solvent, an alkyl halide-based solvent, an amide-based solvent, a sulfoxide-based solvent, a heterocyclic compound, a hydrocarbon-based solvent, an ester-based solvent, and an ether-based solvent. Among these, a high-boiling-point organic solvent having a boiling point of 180° C. or higher is preferable as the organic solvent, because this solvent enables the ink to maintain jettability for a long period of time.

Examples of the high-boiling-point organic solvent include phenoxyethanol, ethylene glycol monomethyl ether, diethylene glycol monomethyl ether, diethylene glycol monoethyl ether, and diethylene glycol diethyl ether. One solvent may be used alone, or two or more solvents may be used in combination.

In the present disclosure, from the viewpoint of jetting stability, the viscosity of each image recording ink is preferably 30 mPa·s or less, more preferably 0.5 mPa·s to 20 mPa·s, and even more preferably 1 mPa·s to 15 mPa·s.

The viscosity of the image recording ink is a value measured using a viscometer (VISCOMETER RE-85L, manufactured by TOKI SANGYO CO., LTD.) at a liquid temperature kept at 25° C.

In the present disclosure, the surface tension of each image recording ink is preferably 20 mN/m to 40 mN/m, and more preferably 23 mN/m to 35 mN/m. The surface tension of the image recording ink is preferably 30 mN/m or less in terms of wettability, and 20 mN/m or more in terms of permeability and suppression of image bleeding.

The surface tension is a value measured using a tensiometer (DY-700, manufactured by Kyowa Interface Science Co., Ltd.) at a liquid temperature kept at 30° C.

Image Recording Method

The image recording method of the present disclosure includes a base layer forming step of forming a base layer by applying a base ink containing at least one polymerizable compound selected from the group consisting of a monofunctional compound and a difunctional compound to a substrate by an inkjet recording method and an image recording step of recording an ink image by applying an image recording ink containing a polymerizable liquid crystal compound and a chiral compound to the base layer by an inkjet recording method.

Base Layer Forming Step

The base layer forming step is a step of forming a base layer by applying a base ink containing at least one polymerizable compound selected from the group consisting of a monofunctional compound and a difunctional compound to a substrate by an inkjet recording method. As the base ink, the base ink described above can be used. As the inkjet recording method, a known method can be adopted.

As the substrate to which the base ink is applied, any substrate can be selected without particular limitations. The substrate may be any of an ink-absorbing substrate, a substrate having low ink absorbency, and a non-ink-absorbing substrate. Examples of the substrate include paper, leather, fabric, and a plastic film.

In the base layer forming step, it is preferable to heat the substrate in the process of applying the base ink to the substrate. Heating the substrate makes it possible to facilitate the fixing of the base ink to the substrate.

The heating unit is not particularly limited, and examples thereof include a heat drum, hot air, an infrared lamp, an oven, a heat plate, and a hot plate. The heating temperature is preferably 200° C. or lower, more preferably 40° C. to 100° C., and even more preferably 45° C. to 80° C.

The base layer forming step preferably includes a step of irradiating the substrate with active energy rays after the base ink is applied to the substrate. The polymerizable compounds contained in the base ink are polymerized and cured by irradiation with active energy rays. Examples of the active energy rays include ultraviolet rays, visible rays, and electron beams. Among these, ultraviolet rays (hereinafter, also called "UV") are preferable.

The peak wavelength of the ultraviolet rays is, for example, preferably 200 nm to 405 nm, more preferably 220 nm to 390 nm, and even more preferably 220 nm to 380 nm.

It is appropriate for the ultraviolet rays to be radiated at an energy of 20 mJ/cm$^2$ to 5 J/cm$^2$ and preferably at an energy of 100 mJ/cm$^2$ to 1,500 mJ/cm$^2$. The irradiation time is preferably 0.01 seconds to 120 seconds, and more preferably 0.1 seconds to 90 seconds. As the irradiation conditions and the basic irradiation method, the irradiation conditions and the irradiation method disclosed in JP1985-132767A (JP-S60-132767A) can be adopted. Specifically, the irradiation method is preferably a method of providing a light source on both sides of a head unit including an inkjet device and scanning the substrate by the head unit and the light source by a so-called shuttle method, or a method of irradiating the substrate with another light source that is not involved in driving.

As the light source for ultraviolet irradiation, a mercury lamp, a gas laser, and a solid-state laser are mainly used. A mercury lamp, a metal halide lamp, and an ultraviolet fluorescent lamp are widely known light sources. In addition, using a gallium nitride (GaN)-based semiconductor ultraviolet light emitting device as a substitute light source is industrially and environmentally extremely useful. Furthermore, a UV light emitting diode (LED) and a UV laser diode (LD) are promising light sources for ultraviolet irradiation because these are compact, have long service life and high efficiency, and inexpensive. Among these, a metal halide lamp, a high-pressure mercury lamp, a medium-pressure mercury lamp, a low-pressure mercury lamp, or UV-LED is preferable as a light source for ultraviolet irradiation.

Image Recording Step

In the image recording method of the present disclosure, an image recording step is performed after the base layer forming step. The image recording step is a step of recording an ink image by applying an image recording ink containing a polymerizable liquid crystal compound and a chiral compound to the base layer by an inkjet recording method. As the image recording ink, the image recording ink described above can be used. As the inkjet recording method, a known method can be adopted.

In the image recording step, it is preferable to apply at least two image recording inks having different reflection wavelengths and to adjust the density of jetted droplets of at least one of the at least two image recording inks so that the density of the ink image is adjusted. The density of jetted droplets of an ink refers to the density of dots formed of the ink having landed on a substrate. In a case where the amount of ink to be jetted per unit area is adjusted, it is possible to express the intensity of hue. As a method for forming a dot pattern and a method for changing the dot density, a known technique relating to an inkjet recording method can be used.

In the image recording step, by applying at least two image recording inks having different reflection wavelengths, it is possible to record an ink image having a plurality of regions reflecting light of different wavelength ranges. Furthermore, by applying at least two image recording inks containing polymerizable liquid crystal compounds that form cholesteric liquid crystals having helical structures twisting in different directions, it is possible to record an ink image having a plurality of regions in different polarization states.

The selective reflection wavelength of the ink image formed by the image recording method of the present disclosure can be set to any of the visible range (about 380 to 780 nm) and the near infrared range (about 780 to 2,000 nm). For example, the wavelength range of red light (light in the wavelength range of 620 nm to 750 nm), green light (light in the wavelength range of 495 nm to 570 nm), or blue light (light in the wavelength range of 420 nm to 490 nm) may be adopted as the selective reflection wavelength, or other wavelength ranges may be adopted as the selective reflection wavelength. Furthermore, the wavelength range of infrared rays may be adopted as the selective reflection wavelength. The infrared rays are light in a wavelength range of more than 780 nm and 1 mm or less. Especially, near-infrared light is light in a wavelength range of more than 780 nm and 2,000 nm or less. The wavelength range of ultraviolet rays may also be adopted as the selective reflection wavelength. Ultraviolet rays are light in a wavelength range of 10 nm or more and less than 380 nm.

In the image recording step, it is preferable to heat the substrate, on which the base layer is formed, in the process of applying the image recording ink to the base layer. Heating the substrate on which the base layer is formed facilitates the fixing of the image recording ink to the base layer. The heating can be performed under the same conditions as the heating in the base layer forming step.

The image recording step preferably includes a step of irradiating the base layer with active energy rays after applying the image recording ink to the base layer. The polymerizable liquid crystal compounds contained in the image recording ink are polymerized and cured by irradiation with active energy rays. The polymerizable liquid crystal compounds form a helical structure due to the presence of the chiral compound, and turn into cholesteric liquid crystals. Examples of the active energy rays include ultraviolet rays, visible rays, and electron beams. Among these, ultraviolet rays are preferable. The irradiation of ultraviolet rays can be performed in the same manner as the irradiation of ultraviolet rays in the base layer forming step.

Furthermore, the image recording step preferably includes a step of heating the image recording ink jetted onto the base layer before the image recording ink having been applied to the base layer is irradiated with active energy rays. Heating the image recording ink jetted onto the base layer makes it possible to more uniformly control the directions of helical axes of the helical structures formed by the polymerizable liquid crystal compounds.

The heating unit is not particularly limited, and examples thereof include a heat drum, hot air, an infrared lamp, an oven, a heat plate, and a hot plate. The heating temperature is preferably 50° C. to 200° C., more preferably 60° C. to 150° C., and even more preferably 70° C. to 120° C.

EXAMPLES

Hereinafter, the present disclosure will be more specifically described based on examples, but the present disclosure is not limited to the following examples as long as the gist of the present disclosure is maintained. In addition, unless otherwise specified, "part" is based on mass. Furthermore, the viscosity of an ink is a value measured using a viscometer (VISCOMETER RE-85L, manufactured by TOKI SANGYO CO., LTD.) at a liquid temperature kept at 25° C.

Example 1

Preparation of Base Ink

The following components were mixed together in a container kept at 25° C., thereby preparing a base ink. The viscosity (25° C.) of the base ink was 10 mPa·s.

| | |
|---|---|
| Tetrahydrofurfuryl acrylate | 14.4 parts by mass |
| Dipropylene glycol diacrylate | 45.3 parts by mass |
| Trimethylolpropane triacrylate | 5.2 parts by mass |
| Tricyclodecanedimethanol diacrylate | 20.6 parts by mass |
| Polymerization initiator: (2,4,6-trimethylbenzoyl)diphenylphosphine oxide (manufactured by BASF SE, trade name "LUCIRIN TPO") | 14.5 parts by mass |

Preparation of Base Layer

By using the prepared base ink and an inkjet printer (manufactured by FUJIFILM Dimatix, Inc., trade name "DMP-2831"), an image was recorded on a vinyl leather sheet (manufactured by YAMAPLAS CO., LTD., trade name "CP-15") which is artificial leather. A striped image was recorded using an inkjet head that has an image resolution of 605 dpi (dot per inch (2.54 cm))×605 dpi and jets 10 pL of an ink. During the image recording, a hot plate was installed on a platen. The temperature of the hot plate was set to 50° C. Then, the substrate was irradiated with ultraviolet rays from a metal halide light source at 500 mJ/cm², thereby forming a 10 μm thick base layer on the substrate.

Preparation of Image Recording Ink

Image Recording Ink Gm1

The following components were mixed together in a container kept at 25° C., thereby preparing an image recording ink Gm1. The viscosity (25° C.) of the image recording ink Gm1 was 11 mPa·s.

| | |
|---|---|
| Diethylene glycol diethyl ether | 392.05 parts by mass |
| Mixture of polymerizable liquid crystal compounds | 100.0 parts by mass |
| Polymerization initiator: bis(2,4,6-trimethylbenzoyl)phenylphosphine oxide (manufactured by BASF SE, trade name "IRGACURE 819") | 2.0 parts by mass |
| Chiral compound A | 5.78 parts by mass |
| Fluorine-based surfactant (manufactured by Neos Corporation, "FTERGENT 208G") | 0.08 parts by mass |

The mixture of polymerizable liquid crystal compounds consists of 50% by mass of the compound (11) ($X^1$=2) and 50% by mass of the compound (12). The compound (11) and the compound (12) are rod-like liquid crystal compounds. The compound (11), the compound (12), and the chiral compound A have the following structures.

(Compound (11))

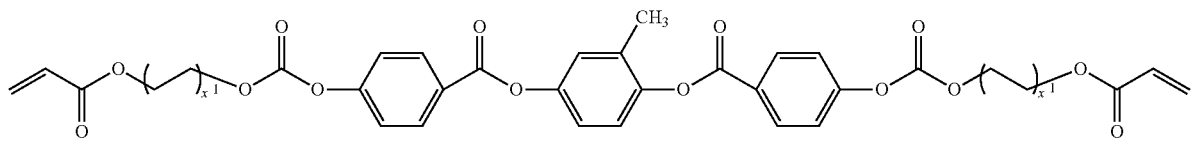

(11)

(Compound (12))

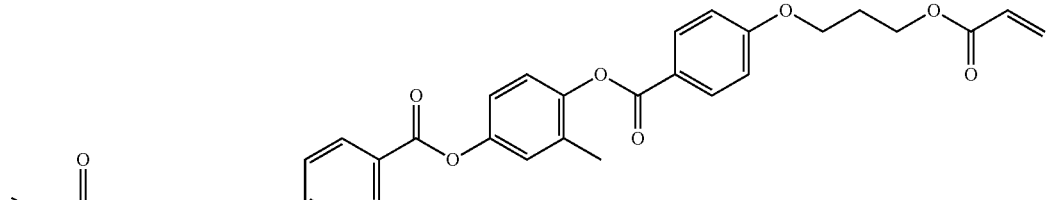

(12)

(Chiral compound A)

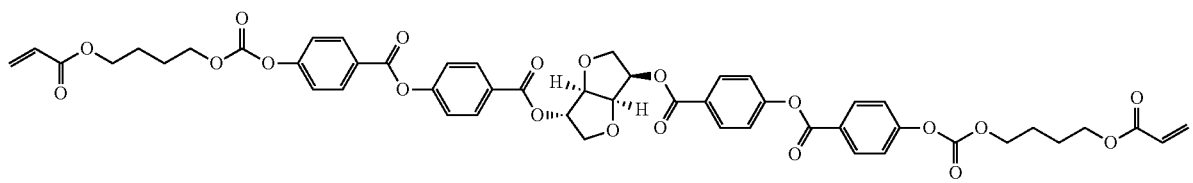

By using a spectral reflectometer (manufactured by Konica Minolta, Inc., trade name "FD-7"), the reflectivity of the image recording ink Gm1 in the visible range was measured. As a result, the image recording ink Gm1 was found to be an ink having a selective reflection wavelength of 550 nm. Furthermore, polarization characteristics were measured using a left-handed circular polarizing plate. As a result, no reflection spectrum was obtained from the image recording ink Gm1. That is, the image recording ink Gm1 was an ink that forms right-handed polarized green dots. Unless otherwise specified, other image recording inks were also measured by the same method as the image recording ink Gm1.

Preparation of Image Recording Ink Rm1

An image recording ink Rm1 was prepared in the same manner as the image recording ink Gm1, except that the content of the chiral compound A in the image recording ink Gm1 was changed to 4.66 parts by mass from 5.78 parts by mass. The image recording ink Rm1 was an ink that had a viscosity (25° C.) of 11 mPa·s and a selective reflection wavelength of 650 nm and formed right-handed polarized red dots reflecting right-handed circularly polarized light.

Preparation of Image Recording Ink Bm1

An image recording ink Bm1 was prepared in the same manner as the image recording ink Gm1, except that the content of the chiral compound A in the image recording ink Gm1 was changed to 7.61 parts by mass from 5.78 parts by mass. The image recording ink Bm1 was an ink that had a viscosity (25° C.) of 11 mPa·s and a selective reflection wavelength of 450 nm and formed right-handed polarized blue dots reflecting right-handed circularly polarized light.

Recording Ink Image

By using the image recording ink Gm1, the image recording ink Rm1, the image recording ink Bm1, and an inkjet printer (manufactured by FUJIFILM Dimatix, Inc., trade name "DMP-2831"), an ink image was recorded on the surface of the base layer formed on the substrate. A striped image was recorded using an inkjet head that has an image resolution of 605 dpi×605 dpi and jets 10 picoliters (pL) of an ink. During the image recording, a hot plate was installed on a platen. The temperature of the hot plate was set to 50° C. After the image recording was finished, the substrate on which the striped image was formed was stored for 5 minutes in an oven set to 80° C., and irradiated with ultraviolet rays from a metal halide light source at 500 mJ/cm$^2$.

Example 2

The formation of a base layer and recording of an ink image were performed in the same manner as in Example 1, except that the image was recorded on plain paper by using the base ink prepared in Example 1.

Example 3

The image recording ink Gm1 in Example 1 was also used, but the image recording ink Rm1 and the image recording ink Bm1 in Example 1 were changed to an image recording ink Rm2 and an image recording ink Bm2 respectively that were prepared as follows. Except for these, the formation of a base layer and recording of an ink image were performed in the same manner as in Example 1.

Preparation of Image Recording Ink

Image Recording Ink Rm2

The image recording ink Rm2 was prepared in the same manner as the image recording ink Gm1, except that the mixture of the polymerizable liquid crystal compounds in the image recording ink Gm1 was changed to a polymerizable liquid crystal compound (compound (4)) having the following structure.

(Compound (4))

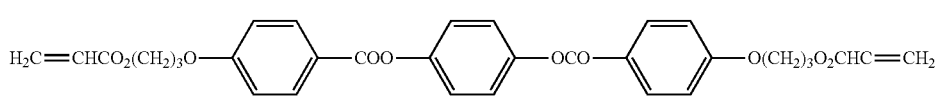

(4)

Image Recording Ink Bm2

The image recording ink Bm2 was prepared in the same manner as the image recording ink Gm1, except that the mixture of the polymerizable liquid crystal compounds in the image recording ink Gm1 was changed to a polymerizable liquid crystal compound (compound (5)) having the following structure.

(Compound (5))

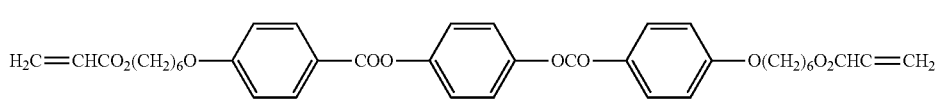

(5)

Example 4

The image recording ink Gm1 in Example 1 was also used, but the image recording ink Rm1 and the image recording ink Bm1 in Example 1 were changed to an image recording ink Rm3 and an image recording ink Bm3 respectively that were prepared as follows. Except for these, the formation of a base layer and recording of an ink image were performed in the same manner as in Example 1.

Preparation of Image Recording Ink

Image Recording Ink Rm3

The image recording ink Rm3 was prepared in the same manner as the image recording ink Gm 1, except that the content of the polymerizable liquid crystal compound in the image recording ink Gm1 was changed to 116.4 parts by mass from 100.0 parts by mass.

Image recording ink Bm3

The image recording ink Bm3 was prepared in the same manner as the image recording ink Gm1, except that the content of the polymerizable liquid crystal compound in the image recording ink Gm1 was changed to 83.1 parts by mass from 100.0 parts by mass.

Example 5

Preparation of Base Ink

The following components were mixed together in a container kept at 25° C., thereby preparing a base ink. The viscosity (25° C.) of the base ink was 10 mPa·s.

| | |
|---|---|
| 3-Methoxybutyl acetate | 79 parts by mass |
| Difunctional urethane acrylate oligomer (manufactured by SARTOMER, trade name "CN9001") | 7.5 parts by mass |
| Hexafunctional urethane acrylate oligomer (manufactured by SHIN-NAKAMURA CHEMICAL CO, LTD., trade name "UA-1100H") | 7.5 parts by mass |
| Polymerization initiator: bis(2,4,6-trimethylbenzoyl)phenylphosphine oxide (manufactured by BASF SE, trade name "IRGACURE 819") | 6 parts by mass |

Preparation of Base Layer

By using the prepared base ink and an inkjet printer (manufactured by FUJIFILM Dimatix, Inc., trade name "DMP-2831"), an image was recorded on a vinyl leather sheet (manufactured by YAMAPLAS CO., LTD., trade name "CP-15") which is artificial leather. A striped image was recorded using an inkjet head that has an image resolution of 605 dpi×605 dpi and jets 10 pL of an ink. During the image recording, a hot plate was installed on a platen. The temperature of the hot plate was set to 50° C. Then, the substrate was irradiated with ultraviolet rays from a metal halide light source at 500 mJ/cm$^2$, thereby forming a 2 μm thick base layer on the substrate.

An ink image was recorded in the same manner as in Example 1, except that the base layer was formed using the base ink prepared as above.

Example 6

The formation of a base layer and recording of an ink image were performed in the same manner as in Example 1, except that the components of the base ink in Example 1 were changed to the following components.

Preparation of Base Ink

The following components were mixed together in a container kept at 25° C., thereby preparing a base ink. The viscosity (25° C.) of the base ink was 10 mPa·s.

| | |
|---|---|
| Tetrahydrofurfuryl acrylate | 16.2 parts by mass |
| Dipropylene glycol diacrylate | 47.1 parts by mass |
| Tricyclodecanedimethanol diacrylate | 22.3 parts by mass |
| Polymerization initiator: (2,4,6-trimethylbenzoyl)diphenylphosphine oxide (manufactured by BASF SE, trade name "LUCIRIN TPO") | 14.5 parts by mass |

Comparative Example 1

Preparation of Base Ink

The following components were mixed together in a container kept at 25° C., thereby preparing a base ink. The base ink had a viscosity (25° C.) of 60 mPa·s.

| | |
|---|---|
| Methyl ethyl ketone | 220 parts by mass |
| Pentaerythritol triacrylate | 100 parts by mass |
| Leveling agent (manufactured by BYK-Chemie GmbH, trade name "BYK361") | 0.03 parts by mass |
| Polymerization initiator: (2,4,6-trimethylbenzoyl)diphenylphosphine oxide (manufactured by BASF SE, trade name "LUCIRIN TPO") | 4 parts by mass |

Preparation of Base Layer

By using a bar coater, the same substrate as that in Example 1 was coated with the prepared base ink. Because the viscosity (25° C.) of the base ink was as high as 60 mPa·s, the inkjet printer failed to jet the base ink. After being coated with the base ink, the substrate was heated such that the film surface temperature reached 80° C., and dried for 120 seconds. Under nitrogen purging at an oxygen concentration of 100 ppm or less, the substrate was irradiated with ultraviolet rays from an ultraviolet irradiation device at 700 mJ/cm$^2$, thereby forming a 10 μm thick base layer on the substrate.

Recording Ink Image

By using the image recording ink Gm 1, the image recording ink Rm1, and the image recording ink Bm1 prepared in Example 1 and an inkjet printer (manufactured by FUJIFILM Dimatix, Inc., trade name "DMP-2831"), an image was recorded on the surface of the base layer formed on the substrate. A striped image was recorded using an inkjet head that has an image resolution of 605 dpi×605 dpi and jets 10 pL of an ink. During the image recording, a hot plate was installed on a platen. The temperature of the hot plate was set to 50° C. After the image recording was finished, the substrate on which the striped image was formed was stored for 5 minutes in an oven set to 80° C., and irradiated with ultraviolet rays from a metal halide light source at 500 mJ/cm$^2$.

Comparative Example 2

An ink image was recorded directly on the same substrate as that in Example 1 by the same method as in Example 1 without forming a base layer.

Comparative Example 3

An ink image was recorded directly on the same substrate as that in Example 2 by the same method as in Example 2 without forming a base layer.

Table 1 shows the type of the substrate used in examples and comparative examples, the content of the polymerizable compound contained in the base ink, and the types of the three image recording inks. The content of the polymerizable compound contained in the base ink is subdivided into the total content of the monofunctional polymerizable compound and the difunctional polymerizable compound and the total content of the polymerizable compound having three or more functional groups. Furthermore, for the comparative example in which the base layer is not formed, "-" is marked in the columns of "Base ink" and "Texture of substrate".

Evaluation (1) Color Developability

Color developability was evaluated by measuring the spectral reflection spectrum with a spectral reflectometer (manufactured by Konica Minolta, Inc., trade name "FD-7"). Based on the reflectivity of each image recording ink at a selective reflection wavelength, color developability was evaluated. Specifically, color developability was evaluated based on a reflectivity at 550 nm for the image recording inks Gm1 to Gm3, on a reflectivity at 650 nm for the image recording inks Rm1 to Rm3, and on a reflectivity at 450 nm for the image recording inks Bm1 to Bm3. The evaluation standard is as follows. A and B are levels at which no problem arises in practical use. The evaluation results are shown in Table 1.

Evaluation Standard

A: The reflectivity is 7% or more.
B: The reflectivity is 4% or more and less than 7%.
C: The reflectivity is less than 4%.

(2) Substrate Texture

The substrate on which the ink image was formed was supported at both end parts thereof, and a force of 10 N was applied thereto so that the image recording surface curved outwards. The image recording surface was visually observed to check whether or not breakage occurred. For examples in which no breakage occurred, it was concluded that the texture of the substrate was not impaired. The evaluation standard is as follows. A and B are levels at which no problem arises in practical use. The evaluation results are shown in Table 1. Note that substrate texture was not evaluated in Comparative Examples 2 and 3 because no base layer was formed in these examples.

Evaluation Standard

A: Breakage is not observed.
B: Some streaks are observed.
C: Breakage is observed.

TABLE 1

| | | Base ink Polymerizable compound (% by mass) | | | Evaluation | |
|---|---|---|---|---|---|---|
| | | | Compound having 3 | | | |
| | Substrate | Monofunctional, disfunctional | or more functional groups | Type of image recording ink | Color developability | Texture of substrate |
| Example 1 | Artificial leather | 80.3 | 5.2 | Three types consisting of Rm1, Gm1, and Bm1 | A | A |
| Example 2 | Plain paper | 80.3 | 5.2 | Three types consisting of Rm1, Gm1, and Bm1 | A | A |
| Example 3 | Artificial leather | 80.3 | 5.2 | Three types consisting of Rm2, Gm1, and Bm2 | A | A |
| Example 4 | Artificial leather | 80.3 | 5.2 | Three types consisting of Rm3, Gm1, and Bm3 | A | A |
| Example 5 | Artificial leather | 7.5 | 7.5 | Three types consisting of Rm1, Gm1, and Bm1 | A | A |
| Example 6 | Artificial leather | 85.6 | 0 | Three types consisting of Rm1, Gm1, and Bm1 | A | A |
| Comparative Example 1 | Artificial leather | 0 | 30.9 | Three types consisting of Rm1, Gm1, and Bm1 | B | C |
| Comparative Example 1 | Artificial leather | — | — | Three types consisting of Rm1, Gm1, and Bm1 | C | — |
| Comparative Example 1 | Plain paper | — | — | Three types consisting of Rm1, Gm1, and Bm1 | C | — |

As shown in Table 1, in Examples 1 to 6 in which a base ink was applied to a substrate and then an image recording ink containing a polymerizable liquid crystal compound and a chiral compound were applied thereto, excellent color development could be realized without impairing the texture of the substrate. Furthermore, as shown in Examples 1 and 2, excellent color development could be realized regardless of the type of substrate. On the other hand, it was confirmed that in Comparative Example 1 in which the base ink did not contain at least one polymerizable compound selected from the group consisting of a monofunctional polymerizable compound and a difunctional polymerizable compound, breakage occurred in the substrate due to bending stress. Furthermore, it was confirmed that excellent color developability was not obtained in Comparative Examples 2 and 3 in which an image recording ink was directly applied to the substrate without forming a base layer.

As described above, the ink set for inkjet recording of the present disclosure includes a base ink which contains at least one polymerizable compound selected from the group consisting of a monofunctional polymerizable compound and a difunctional polymerizable compound and an image recording ink which contains a polymerizable liquid crystal compound and a chiral compound, and can realize excellent color development without impairing the texture of a substrate regardless of the type of substrate. Furthermore, according to the image recording method of the present disclosure, it is possible to realize excellent color development without impairing the texture of a substrate regardless of the type of substrate.

The entire disclosure of Japanese Patent Application No. 2019-064593, filed Mar. 28, 2019, is incorporated into the present specification by reference. In addition, all documents, patent applications, and technical standards described in the present specification are incorporated into the present specification by reference, as if each of the documents, the patent applications, and the technical standards is specifically and individually described.

What is claimed is:

1. An ink set for inkjet recording, comprising:
    a base ink comprising (a) at least one difunctional polymerizable compound but no monofunctional polymerizable compound, or (b) at least one difunctional polymerizable compound and at least one monofunctional polymerizable compound; and
    an image recording ink comprising a polymerizable liquid crystal compound and a chiral compound.

2. The ink set for inkjet recording according to claim 1, wherein the base ink comprises at least two polymerizable compounds including the at least one polymerizable compound.

3. The ink set for inkjet recording according to claim 2, wherein the at least two polymerizable compounds include the at least one polymerizable compound and at least one polymerizable compound having three or more functional groups.

4. The ink set for inkjet recording according to claim 1, wherein the base ink is an active energy ray-curable ink.

5. The ink set for inkjet recording according to claim 1, wherein the base ink and the image recording ink each have a viscosity of 30 mPa·s or less.

6. The ink set for inkjet recording according to claim 1, wherein:
    the image recording ink includes at least two image recording inks respectively having different reflection wavelengths, and
    the at least two image recording inks differ from each other in terms of a content of the chiral compound.

7. The ink set for inkjet recording according to claim 1, wherein:
- the image recording ink includes at least two image recording inks respectively having different reflection wavelengths, and
- the at least two image recording inks differ from each other in terms of at least one of a type of the polymerizable liquid crystal compound or a content of the polymerizable liquid crystal compound.

8. An image recording method using the ink set for inkjet recording according to claim 1, the method comprising:
- forming a base layer by applying the base ink to a substrate by inkjet recording method; and
- recording an ink image by applying the image recording ink to the base layer by inkjet recording method.

9. The image recording method according to claim 8, wherein forming the base layer includes irradiating the base ink applied to the substrate with an active energy ray.

\* \* \* \* \*